(12) United States Patent
Choi et al.

(10) Patent No.: US 10,959,023 B2
(45) Date of Patent: Mar. 23, 2021

(54) DISPLAY APPARATUS

(71) Applicant: LG Display Co., Ltd., Seoul (KR)

(72) Inventors: Mingyu Choi, Paju-si (KR); JuHun Min, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/406,574

(22) Filed: May 8, 2019

(65) Prior Publication Data

US 2019/0349685 A1 Nov. 14, 2019

(30) Foreign Application Priority Data

May 10, 2018 (KR) .......... 10-2018-0053660

(51) Int. Cl.
    *H04R 7/04* (2006.01)
    *G02F 1/13357* (2006.01)
    *H04R 1/02* (2006.01)
    *G02F 1/1333* (2006.01)

(52) U.S. Cl.
    CPC ....... *H04R 7/045* (2013.01); *G02F 1/133308* (2013.01); *G02F 1/133603* (2013.01); *G02F 1/133605* (2013.01); *G02F 1/133606* (2013.01); *G02F 1/133608* (2013.01); *H04R 1/028* (2013.01); *G02F 2001/133314* (2013.01); *G02F 2001/133607* (2013.01); *G02F 2001/133614* (2013.01); *H04R 2499/15* (2013.01)

(58) Field of Classification Search
    CPC .......................... H04R 7/045; G02F 1/133602
    See application file for complete search history.

(56) References Cited

U.S. PATENT DOCUMENTS

| | | | |
|---|---|---|---|
| 2011/0242796 A1* | 10/2011 | Yang | C09J 11/02 362/97.1 |
| 2015/0023055 A1* | 1/2015 | Hwang | G02B 6/0025 362/608 |
| 2015/0277023 A1* | 10/2015 | Etienne | G02B 5/0221 362/613 |
| 2015/0323728 A1* | 11/2015 | Lee | G02B 6/0043 362/97.1 |
| 2016/0192047 A1* | 6/2016 | Chang | G02B 6/0023 381/111 |
| 2016/0377786 A1* | 12/2016 | Ham | G02B 6/0088 349/65 |
| 2017/0127166 A1* | 5/2017 | Noma | H04R 7/16 |

* cited by examiner

*Primary Examiner* — Eric T Eide
(74) *Attorney, Agent, or Firm* — Morgan, Lewis & Bockius LLP (57) ABSTRACT

A display apparatus includes: a display panel, a backlight unit on a rear surface of the display panel, the backlight unit including: a light source unit including a plurality of light sources overlapping a display area of the display panel, an optical layer on the rear surface of the display panel, and a diffusion layer between the light source unit and the optical layer, the diffusion layer being configured to diffuse light emitted from the plurality of light sources, and a vibration generating device configured to vibrate the backlight unit.

30 Claims, 5 Drawing Sheets

DISPLAY APPARATUS

CROSS-REFERENCE TO RELATED APPLICATION(S)

This application claims the benefit of and priority to Korean Patent Application No. 10-2018-0053660, filed on May 10, 2018, the entirety of which is hereby incorporated by reference.

BACKGROUND

1. Technical Field

The present disclosure relates to a display apparatus.

2. Discussion of the Related Art

Recently, as society advances toward an information-oriented society, the field of display apparatuses for visually expressing an electrical information signal has rapidly advanced. Various display apparatuses, having excellent performance in terms of thinness, lightness, and low power consumption, are being developed correspondingly. Examples of the display apparatuses include liquid crystal display (LCD) apparatuses, field emission display (FED) apparatuses, organic light-emitting display apparatuses, etc.

The LCD apparatuses each include an array substrate including a thin film transistor (TFT), an upper substrate including a color filter and/or a black matrix, and a liquid crystal layer between the array substrate and the upper substrate. The LCD apparatuses are apparatuses in which an alignment state of the liquid crystal layer is adjusted with an electric field generated between two electrodes provided in a pixel area, and a transmittance of light is adjusted based on the alignment state, thereby displaying an image.

The organic light-emitting display apparatuses, which are self-emitting devices, have a fast response time, high emission efficiency, excellent luminance, and a wide viewing angle in comparison with other display apparatuses. Thus, organic light-emitting display apparatuses are attracting much attention.

Generally, display apparatuses may display an image on a display panel, but a separate speaker should be installed for providing sound. When a speaker is installed in a display apparatus, a traveling direction of sound output through the speaker is a direction toward a side end or an upper/lower end of the display panel, instead of a front surface or a rear surface of the display panel. Thus, the sound does not travel in a direction toward a viewer who is watching an image in front of the display panel, whereby an immersion experience of the viewer watching the image is reduced.

Moreover, sound output through a speaker travels to a side surface of a display panel or an upper/lower surface of the display panel, so the quality of the sound is degraded due to interference of sound reflected from a wall or a floor. Moreover, when a speaker included in a set apparatus, such as a televisions (TV), is provided, the speaker occupies a certain space, so the design and space disposition of the set apparatus are limited.

SUMMARY

Accordingly, the present disclosure is directed to a display apparatus that substantially obviates one or more of the issues due to limitations and disadvantages of the related art.

An aspect of the present disclosure is to provide a display apparatus that outputs sound to a forward region in front of a display panel, and matches an image generating position with a sound-generating position to maximize a sense of reality and immersion.

Another aspect of the present disclosure is to provide a display apparatus that improves the quality of sound output to a forward region in front of a display panel, and improves light luminance uniformity, thereby improving image quality.

Another aspect of the present disclosure is to provide a display apparatus in which a density of a vibration-transferred backlight unit increases to increase a sound transfer effect, and light emitted from a light source is diffused to a front surface of a display panel to improve light luminance uniformity.

Another aspect of the present disclosure is to provide a display apparatus that simultaneously improves a vibration transfer characteristic and light luminance uniformity using a backlight unit including a diffusion layer between a light source unit and an optical layer to diffuse light emitted from a plurality of light sources.

Another aspect of the present disclosure is to provide a display apparatus in which a speaker is not separately provided in a space other than a region of a display panel, to improve a sense of design beauty.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a display apparatus, including: a display panel, a backlight unit on a rear surface of the display panel, the backlight unit including: a light source unit including a plurality of light sources overlapping a display area of the display panel, an optical layer on the rear surface of the display panel, and a diffusion layer between the light source unit and the optical layer, the diffusion layer being configured to diffuse light emitted from the plurality of light sources, and a vibration generating device configured to vibrate the backlight unit.

In another aspect, there is provided a display apparatus, including: a display panel configured to display an image, a backlight unit on a rear surface of the display panel, the backlight unit including: a light source unit, an optical layer, and a diffusion layer between the light source unit and the optical layer, the diffusion layer including a photocurable material and a light diffusing material, a rear structure on a rear surface of the backlight unit, and a vibration generating device configured to vibrate the rear structure or the backlight unit to generate sound.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

In the present disclosure, examples of a display apparatus may include a narrow-sense display apparatus such as an organic light-emitting display (OLED) module or a liquid crystal module (LCM) including a display panel and a driver for driving the display panel. Also, examples of the display apparatus may include a set apparatus or a set electronic apparatus, such as a notebook computer, a television (TV), a computer monitor, an automotive display or another type of equipment display including for vehicles, and/or a mobile electronic apparatus such as a smartphone or an electronic pad, which is a complete product (or a final product) that includes an LCM or an OLED module. Therefore, in the present disclosure, examples of the display apparatus may include a narrow-sense display apparatus itself, such as an LCM or an OLED module, and a set apparatus that is a final consumer apparatus or an application product including the LCM or the OLED module.

Depending on the case, an LCM or an OLED module including a display panel and a driver may be referred to as a narrow-sense display apparatus, and an electronic apparatus that is a final product including an LCM or an OLED module may be referred to as a set apparatus. For example, the narrow-sense display apparatus may include a display panel, such as an LCD or an OLED, and a source printed circuit board (PCB), which is a controller for driving the display panel. The set apparatus may further include a set PCB, which is a set controller electrically connected to the source PCB to overall control the set apparatus.

A display panel applied to the present embodiment may use any type of display panel, such as a liquid crystal display panel, an organic light-emitting diode (OLED) display panel, and an electroluminescent display panel, but is not limited to any particular display panel that may be vibrated by a sound-generation device according to an embodiment to output sound. Also, a shape or a size of a display panel applied to a display apparatus according to the present embodiment is not limited.

For example, if the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT), which is a switching element for adjusting a light transmittance of each of the plurality of pixels, an upper substrate including a color filter and/or a black matrix, and a liquid crystal layer between the array substrate and the upper substrate.

Moreover, if the display panel is the organic light-emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT, which is an element for selectively applying a voltage to each of the pixels, an organic light-emitting device layer on the array substrate, and an encapsulation substrate disposed on the array substrate to cover the organic light-emitting device layer. The encapsulation substrate may protect the TFT and the organic light-emitting device layer from an external impact and may prevent water or oxygen from penetrating into the organic light-emitting device layer. Also, a layer provided on the array substrate may include an inorganic light-emitting layer (for example, a nano-sized material layer, a quantum dot, or the like).

Moreover, the display panel may further include a backing, such as a metal plate attached on the display panel. However, embodiments are not limited to the metal plate, and the display panel may include another structure.

The present inventors have recognized the above-described problems of a speaker installed in a display apparatus, and have made various experiments so that, when watching an image in front of a display panel, a traveling direction of sound becomes a direction toward a forward region in front of the display panel. Thus, sound quality is improved. Through the various experiments, the inventors have implemented a display apparatus having a new structure, which outputs sound so that a traveling direction of sound becomes a direction toward a forward region in front of a display panel, thereby enhancing sound quality.

Hereinafter, a display apparatus according to an embodiment of the present disclosure will be described in detail with reference to the accompanying drawings. In adding reference numerals to elements of each of the drawings, although the same elements are illustrated in other drawings, like reference numerals may refer to like elements.

Figure 1:
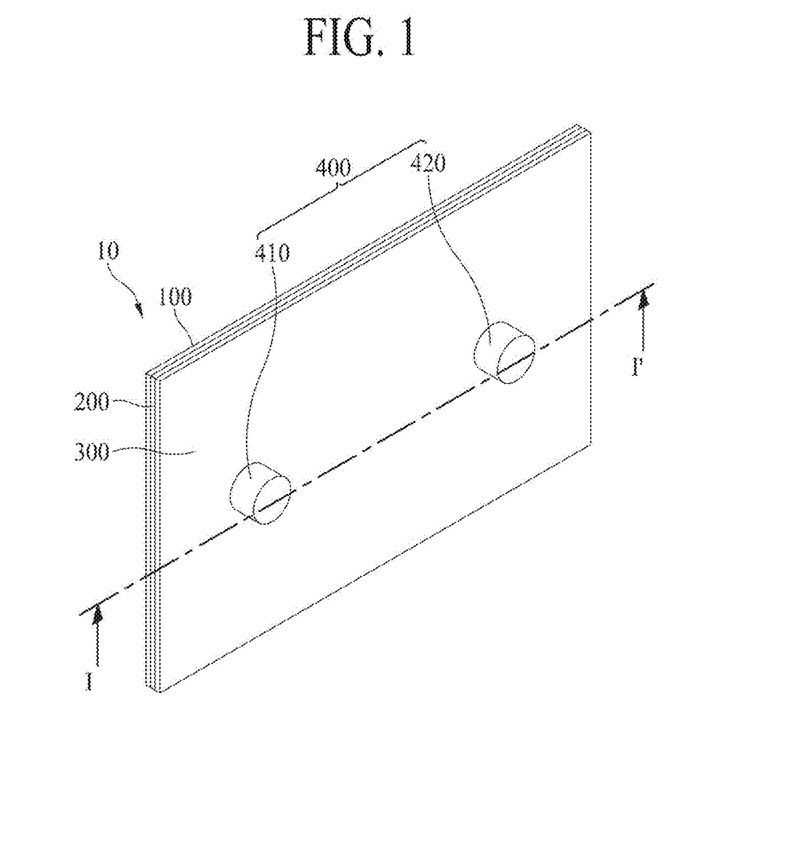
FIG. 1 is a rear view of a display apparatus according to an embodiment of the present disclosure.
Figure 2:
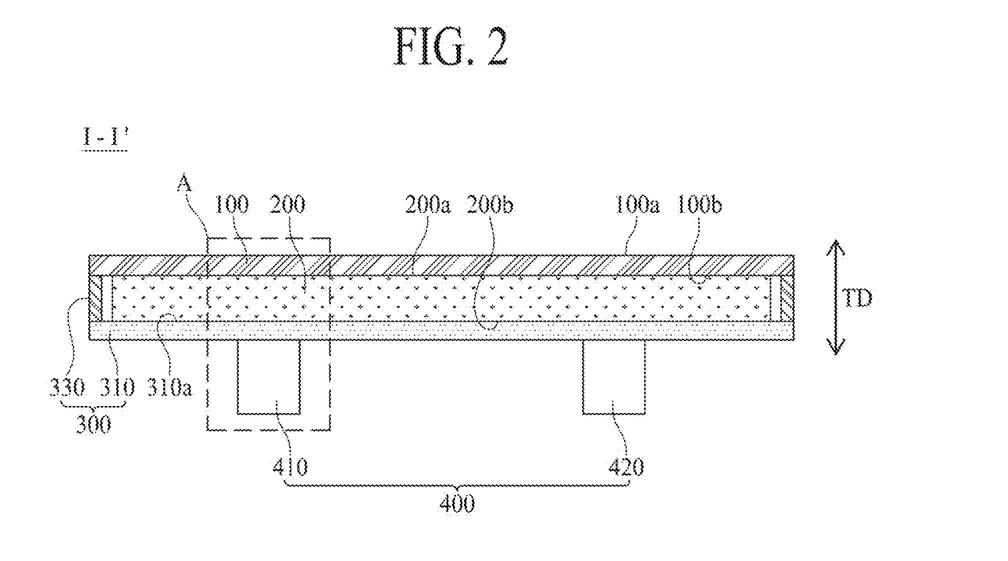
FIG. 2 is a cross-sectional view of a display apparatus according to an embodiment of the present disclosure.

FIG. 1 is a rear view of a display apparatus according to an embodiment of the present disclosure. FIG. 2 is a cross-sectional view of the display apparatus according to an embodiment of the present disclosure.

With reference to FIGS. 1 and 2, a display apparatus 10 may include a display module 100, a backlight unit 200, a rear structure 300, and a vibration generating device 400. The display panel 100 may display an image, and may be implemented as any type of display panel, such as a liquid crystal display panel, an organic light-emitting diode (OLED) display panel, an electroluminescent display panel, etc.

The display panel 100 may include a front surface 100a, which may display an image, and a rear surface 100b onto which light may be irradiated from the backlight unit 200. According to an embodiment, the display panel 100 may be a liquid crystal display panel, and may display an image using the light irradiated from the backlight unit 200.

The backlight unit 200 may be coupled or connected to the rear surface 100b of the display panel 100 with respect to a thickness direction TD of the display panel 100, and may irradiate light onto the rear surface 100b of the display panel 100. For example, a front surface 200a of the backlight unit 200 may be attached on the rear surface 100b of the display panel 100, and a rear surface 200b of the backlight unit 200 may face a front surface 310a of the rear structure 300. The backlight unit 200 may be provided as one body with the rear surface 100b of the display panel 100 through an attachment or assembly process.

According to an embodiment, the backlight unit 200 may have a direct-type backlight structure in which a plurality of light sources are on a rear surface of the display panel 100. An edge-type backlight structure is a structure in which the plurality of light sources are on the edge of the display panel 100. In the direct-type backlight structure, the plurality of light sources are on the rear surface of the display panel 100. Thus, the direct-type backlight structure may need more light sources than the number of light sources of the edge-type backlight structure. Because the plurality of light sources are on the rear surface of the display panel 100, the direct-type backlight structure have a better contrast ratio than the edge-type backlight structure, and may enable local dimming to be easily performed. For example, the local dimming may be that the display panel 100 is divided into a plurality of regions, and luminance of the backlight unit 200 may be adjusted for each of the plurality of regions. Therefore, the backlight unit 200 may be implemented in the direct-type backlight structure, and may have a high dynamic range (HDR) as compared to the edge-type backlight structure, thereby increasing or maximizing the realistic image quality of the display apparatus. Also, when the edge-type backlight structure is applied to the backlight unit 200, a process of manufacturing, as one body, a plurality of optical sheets included in the backlight unit 200 may be needed so that a vibration of the vibration generating device 400 may be transferred to the display panel 100, and light emitted from light sources on side surfaces may be concentrated, causing an increase in power consumption.

Therefore, when the backlight unit 200 has the direct-type backlight structure instead of the edge-type backlight structure, the present inventors have recognized that a vibration of the vibration generating device 400 may not be transferred to the display panel 100 due to a distance between the display panel 100 and the vibration generating device 400. For example, there may be a problem in which a vibration having a high frequency is not transferred to the display panel 100. Therefore, through various experiments, the present inventors have invented a display apparatus having a new structure, which may generate a vibration having a high frequency by applying the direct-type backlight structure to the backlight unit.

The rear structure 300 may surround a side surface and/or a rear surface of the backlight unit 200. For example, the rear structure 300 may surround the side surface and/or the rear surface of the backlight unit 200, and may transfer a vibration, generated by the vibration generating device 400, to the backlight unit 200.

The rear structure 300 may include a rear cover 310 covering the rear surface 200b of the backlight unit 200, and a side cover 330 surrounding a side surface of the backlight unit 200. The rear cover 310 may cover the rear surface 200b of the backlight unit 120, and may have a plate shape including one or more of: a glass material, a metal material, and a plastic material. For example, an edge (or periphery) or a sharp corner of the rear cover 310 may be have a tetragonal shape or a curved shape, e.g., through a chamfer process or a corner rounding process. According to an embodiment, the rear cover 310 including the glass material may include sapphire glass. For example, the rear cover 310 including the metal material may be one of aluminum (Al), an Al alloy, a magnesium (Mg) alloy, and an iron (Fe)-nickel (Ni) alloy. As another example, the rear cover 310 may have a stacked structure, including a metal plate and a glass plate, which has a thickness relatively thinner than that of a metal plate or a glass plate, and may face the rear surface of the backlight unit 200. For example, a rear surface of the display apparatus may be used as a mirror surface due to the metal plate.

The side cover 330 may reduce or prevent light from being leaked through a side surface of the display apparatus surrounding the side surface of the backlight unit 200. For example, the side cover 330 may be between a periphery of a front surface of the rear structure 300 and a periphery of a rear surface, other than one periphery of a front surface, of the display panel 100, and may seal a gap between the display panel 100 and the rear structure 300. Therefore, the side cover 330 may reduce or prevent light irradiated onto the display panel 100 from being leaked to the outside through the side surface of the display apparatus. According to an embodiment, the side cover 330 may include one or more of: a foam pad, a foam tape, an adhesive resin, and/or the like. For example, the side cover 330 may include an acryl-based material or a urethane-based material. The side cover 330 may seal a gap between the rear structure 300 and the display panel 100 exposed to the outside of the display apparatus to improve an appearance design of the display apparatus. As another example, the side cover 330 may be omitted based on a coupling or connection structure of the display panel 100, the backlight unit 200, and the rear cover 310.

According to an embodiment, the vibration generating device 400 may be on a rear surface of the rear structure 300, may be configured to vibrate the rear structure 300, and may transfer the vibration to the backlight unit 200 and the display panel 100. The vibration generating device 400 may vibrate the display panel 100 through the rear structure 300 and the backlight unit 200, and may output sound to a forward region in front of the display panel 100. For example, the vibration generating device 440 may generate sound using the display panel 100, vibrating along with a vibration of the backlight unit 200, as a vibration plate.

According to an embodiment, the vibration generating device 400 may be a speaker, and for example, may be a sound actuator, a sound exciter, and/or a piezoelectric element, but is not limited thereto. For example, the vibration generating device 400 may be a sound device for outputting sound based on an electrical signal.

According to an embodiment, the display panel 100 may include a left region and a right region, and the vibration generating device 400 may include first and second sound generating modules 410 and 420 for vibrating different regions of the display apparatus 100. The first and second sound generating modules 410 and 420 may be attached on the rear surface of the rear structure 300, and may be apart from each other. For example, the first sound generating module 410 may be on the rear surface of the rear structure 300, may overlap the left region of the display panel 100, and may transfer a vibration to the left region of the display panel 100. The second sound generating module 420 may be on the rear surface of the rear structure 300, may overlap the right region of the display panel 100, and may transfer a vibration to the right region of the display panel 100. It should be appreciated that the terms "left" and "right" are used herein only for convenience of explanation, and are interchangeable, as should be understood by one of ordinary skill in the art.

The first and second sound generating modules 410 and 420 may receive different vibration signals. Thus, each of the first and second sound generating modules 410 and 420 may be independently driven. For example, the first sound generating module 410 may generate sound using the left region of the display panel 100 as a vibration plate, vibrating based on a vibration of the rear structure 300 transferred thereto. Similarly, the second sound generating module 420 may generate sound using the right region of the display panel 100 as a vibration plate, vibrating based on a vibration of the rear structure 300 transferred thereto.

Therefore, using the display panel 100 vibrating through the backlight unit 200 as a vibration plate of a sound device, the display apparatus according to an embodiment of the present disclosure may output sound to a forward region in front of the display panel 100 instead of a rearward region behind the display panel 100. Thus, an image generating position of the display apparatus may match a sound-generating position of the display apparatus, thereby improving an immersion experience of a viewer watching an image displayed by the display apparatus.

Figure 3:
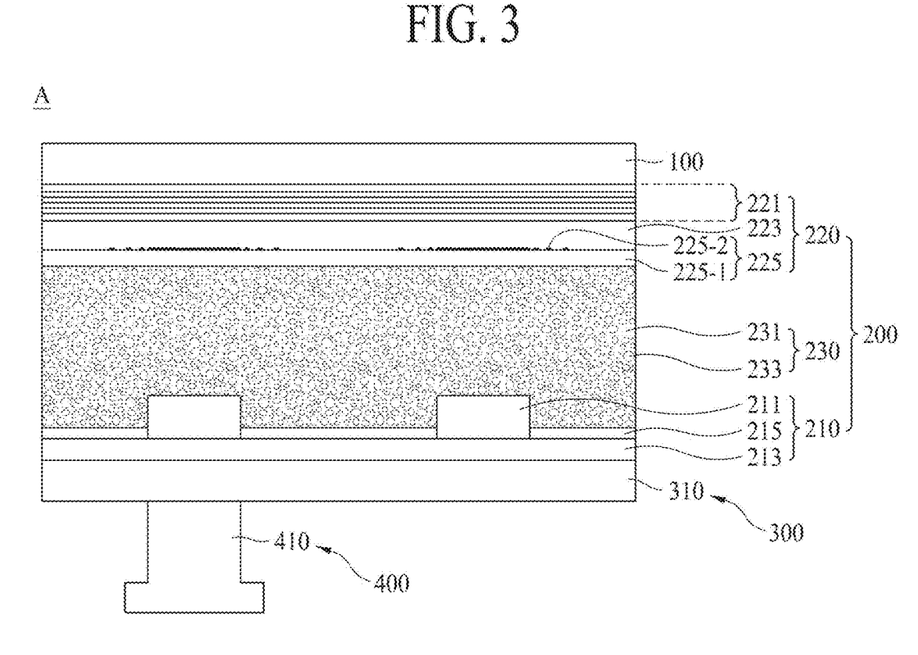
FIG. 3 is a cross-sectional view illustrating region A of FIG. 2 in a display apparatus according to an embodiment of the present disclosure.

FIG. 3 is a cross-sectional view illustrating region A of FIG. 2 in a display apparatus according to an embodiment of the present disclosure.

With reference to FIG. 3, a backlight unit 200 may include a light source unit 210, an optical layer 220, and a diffusion layer 230. The light source unit 210 may include a plurality of light sources 211, a printed circuit board (PCB) 213, and a reflective sheet 215. The plurality of light sources 211 may overlap a display area of the display panel 100, and may irradiate light onto the display panel 100. Light emitted from the plurality of light sources 211 may sequentially pass through the diffusion layer 230 and the optical layer 220, and may reach the display panel 100, and the display panel 100 may display an image based on the alignment of a liquid crystal layer. Therefore, the plurality of light sources 211 may overlap the display area of the display panel 100, and the backlight unit 200 may have the direct-type backlight structure.

According to an embodiment, the light sources 211 of the backlight unit 200 may each include a light-emitting diode (LED) or a mini LED. The mini LED may be a small-sized LED, including a light source chip having a size of about 100 μm to about 500 μm. The light sources 211 may each be implemented with a mini LED. Thus, even when the light sources 211 have the direct-type backlight structure, the light sources 211 may each have a thickness similar to that of the edge-type backlight structure. Also, the light sources 211 may each have the high dynamic range (HDR) incapable of being implemented in the edge-type backlight structure, and may easily perform local dimming.

The PCB 213 may drive the plurality of light sources 211 mounted thereon. For example, a wiring for supplying power to the plurality of light sources 211 and a circuit for driving the plurality of light sources 211 may be further mounted on the PCB 213. According to an embodiment, the PCB 213 may be on a rear surface of the backlight unit 200, and may face a front surface of a rear structure 300. Therefore, the PCB 213 may receive a vibration, generated by a vibration generating device 400, from the rear structure 300, and may transfer the vibration to the reflective sheet 215 and the diffusion layer 230.

According to an embodiment, the PCB 213 may be implemented as one board on which the plurality of light sources 211 are all mounted, or may be implemented as a plurality of boards on which a plurality of groups, each including some of the plurality of light sources 211, are respectively mounted. For example, the PCB 213 may be changed to various configurations, based on an arrangement structure of the plurality of light sources 211 and a driving method of the plurality of light sources 211.

The reflective sheet 215 may be on the PCB 213, and may reflect light emitted from the plurality of light sources 211. For example, the reflective sheet 215 may reduce or prevent the light emitted from the plurality of light sources 211 from being leaked to a rear surface of the backlight unit 200, and may reflect the light emitted from the plurality of light sources 211 to the display panel 100. Also, the reflective sheet 215 may receive a vibration generated by the vibration generating device 400 through the rear structure 300 and the PCB 213, and may transfer the vibration to the diffusion layer 230 and the optical layer 220. The optical layer 220 may include an optical sheet part 221, a diffuser plate 223, and a printed plate 225.

The optical sheet part 221 may be on the rear surface of the display panel 110. For example, the optical sheet part 221 may improve luminance characteristic of light emitted from the light source unit 210, and may transfer a vibration of each of the diffusion layer 230, the printed plate 225, and the diffuser plate 223 to the display panel 100. According to an embodiment, the optical sheet part 221 may include a complex optical sheet that has a function of diffusing light incident thereon and a function of collecting the diffused light.

According to an embodiment, the optical sheet part 221 may be attached to the rear surface of the display panel 100 through a lamination process using a transparent adhesive member. For example, the transparent adhesive member may include one or more of: an optically clear adhesive (OCA), an optically clear resin (OCR), a porous optically clear adhesive (OCA), and a porous optically clear resin (OCR). As another example, when the optical sheet part 221 includes one complex optical sheet, the optical layer 220 may further include a plurality of light collection pattern, including a prism or lenticular pattern.

According to an embodiment, the optical sheet part 221 may include at least one of first to third optical sheets. The first optical sheet may be a first diffuser sheet, including a light scattering layer or a light scattering particle, and may be on a front surface of the diffuser plate 223 to primarily scatter or diffuse and output light incident from the diffuser plate 223. The second optical sheet may be a second diffuser sheet, including a light scattering layer or a light scattering particle, and may be attached on a front surface of the first optical sheet to secondarily scatter or diffuse and output light incident from the first optical sheet. The third optical sheet may be a prism sheet, including a plurality of prism patterns, and may be attached on a front surface of the second optical sheet to collect, through the plurality of prism patterns, light incident from the second optical sheet and output the collected light.

As another example, the second optical sheet may be replaced by a lower prism sheet. According to an embodiment, the lower prism sheet may include a plurality of lower prism patterns that extend lengthwise in a horizontal axis direction and contact one another in a vertical axis direction. In this case, the third optical sheet may be an upper prism sheet. According to an embodiment, the upper prism sheet may include a plurality of upper prism patterns that extend lengthwise in a vertical axis direction and contact one another in a horizontal axis direction. Therefore, the lower prism sheet and the upper prism sheet may intersect each other.

The optical sheet part 221 may further include a fluorescent sheet including a fluorescent material. For example, the light source unit 210 may be on a rear surface of the diffusion layer 230, and a fluorescent sheet of the optical sheet part 221 may be on a front surface of the diffusion layer 230. For example, the light source unit 210 and the fluorescent sheet of the optical sheet part 221 may be opposite to each other with respect to the diffusion layer 230. In this case, light emitted from the plurality of light sources 211 may pass through the diffusion layer 230, and may be provided to the display panel 100 via the fluorescent sheet of the optical sheet part 221. For example, the backlight unit 200 may allow the light emitted from the plurality of light sources 211 to sequentially pass through the diffusion layer 230 and the fluorescent sheet, thereby providing white light to the display panel 100.

According to an embodiment, each of the plurality of light sources 211 of the light source unit 210 may emit light having one of red, green, and blue, and the fluorescent sheet of the optical sheet part 221 may include a fluorescent material having a color differing from colors of the light emitted from the plurality of light sources 211. For example, the color of the light emitted from each of the plurality of light sources 211 and the color of the fluorescent material of the fluorescent sheet may be designed so that the backlight unit 200 emits white light. The light source 211 may include an LED package, and for example, may include a chip size package (CSP), a structure in which a flip chip includes a phosphor, and a structure in which a lateral chip includes a phosphor, but is not limited thereto.

For example, a chip of each of the plurality of light sources 211 of the light source unit 210 may not include a phosphor, and may emit blue, and the fluorescent sheet of the optical sheet part 221 may include a yellow or yellow-green fluorescent material. For example, blue light emitted from each of the plurality of light sources 211 may pass through the diffusion layer 230, and may pass through the fluorescent sheet including the yellow or yellow-green fluorescent material to be white.

For example, a chip of each of the plurality of light sources 211 of the light source unit 210 may emit blue, and may include a fluorescent substance of red, and the fluorescent sheet of the optical sheet part 221 may include a green fluorescent material. The light emitted from the plurality of light sources 211 may be white.

As another example, a chip of each of the plurality of light sources 211 of the light source unit 210 may emit blue, and may include a fluorescent substance of green, and the fluorescent sheet of the optical sheet part 221 may include a red fluorescent material. The light emitted from the plurality of light sources 211 may be white.

When white light emitted from the light source unit 210 passes through the diffusion layer 230, the diffusion layer 230 may absorb a particular wavelength, causing a color shift. For example, the color shift may cause blurring of an image displayed by the display panel 100, thereby reducing the reliability of the display apparatus. To solve such a problem, in the backlight unit 200 according to an embodiment of the present disclosure, because the light source unit 210 and the fluorescent sheet of the optical sheet part 221 are opposite to each other with respect to the diffusion layer 230, the white light may not pass through the diffusion layer 230. Accordingly, the backlight unit 200 according to an embodiment of the present disclosure may be adjusted so that the white light may not pass through the diffusion layer 230, thereby reducing or preventing the occurrence of the color shift.

The diffuser plate 223 may be on a rear surface of the optical sheet part 221. According to an embodiment, the diffuser plate 223 may include a material that is higher in optical diffusivity than the optical sheet part 221. For example, the diffuser plate 223 may be between the optical sheet part 221 and the printed plate 225. Thus, diffusivity of the light emitted from the light source unit 210 may be improved. Although the optical sheet part 221 may include at least one diffuser sheet, because the optical layer 220 may further include the diffuser plate 223, optical diffusivity may be improved.

According to an embodiment, the diffuser plate 223 may include a material that is higher in a vibration transfer characteristic than the optical sheet part 221. For example, a thickness of the diffuser plate 223 may be thicker than that of one sheet in the optical sheet part 221. The diffuser plate 223 may improve the optical diffusivity, and may support the optical sheet part 221. Accordingly, the diffuser plate 223 may support the optical sheet part 221 including the plurality of optical sheets, thereby improving a vibration transfer characteristic of the optical layer 220.

As described above, the diffuser plate 223 may include a material that is higher in at least one of optical diffusivity and a vibration transfer characteristic than the optical sheet part 221. Thus, the optical diffusivity and a vibration transfer characteristic of the optical layer 220 may be improved.

The printed plate 225 may be on a rear surface of the diffuser plate 223, and may disperse the light emitted from the light source unit 210 to a front surface of the optical layer 220. For example, the printed plate 225 may be between the diffuser plate 223 and the diffusion layer 230, and may disperse the light emitted from the light source unit 210 to the front surface of the optical layer 220. Also, the printed plate 225 may transfer a vibration, transferred from the diffusion layer 230, to the display panel 100 through the diffuser plate 223 and the optical sheet part 221.

The printed plate 225 may include a base film 225-1 and a reflective material 225-2 on the base film 225-1. The base film 225-1 may include a material that is high in light transmittance and a vibration transfer characteristic. For example, the base film 225-1 may include a poly ethylene terephthalate (PET)-based material, but is not limited thereto.

The reflective material 225-2 may be printed in a region overlapping each of the plurality of light sources 211, on the base film 225-1. The reflective material 225-2 may be mainly disposed in the region overlapping each of the plurality of light sources 211. Thus, the reflective material 225-2 may reduce or prevent the light emitted from the light source unit 210 from concentrating on a certain portion, and may disperse the light, emitted from the light source unit 210 to the front surface of the optical layer 220.

The printed plate 225 may be configured as one body with the optical sheet part 221. Thus, a vibration of the vibration generating device 400 may be transferred to the display panel 100 without being attenuated.

According to an embodiment, the amount of reflective material 225-2 printed on the base film 225-1 may decrease along a direction from the region overlapping each of the plurality of light sources 221. For example, the amount of reflective material 225-2 printed on the base film 225-1 may decrease along a direction outward from the region overlapping each of the plurality of light sources 221. For example, the reflective material 225-2 may be mainly printed in the region overlapping each of the plurality of light sources 221 on the base film 225-1, and the amount of printed reflective material 225-2 may decrease in a direction outward from the region overlapping each of the plurality of light sources 221. The reflective material 225-2 may include titanium dioxide ($TiO_2$), but is not limited thereto, and may include another material having a high reflectivity.

The diffusion layer 230 may be between the light source unit 210 and the optical layer 220, and may diffuse the light emitted from the plurality of light sources 211 to a whole region (or the entirety) of the backlight unit 200. For example, the diffusion layer 230 may be filled between the light source unit 210 and the optical layer 220 to improve optical diffusivity of the backlight unit 200 and a transfer characteristic of a vibration generated by the vibration generating device 400. The diffusion layer 230 may be filled between the light source unit 210 and the optical layer 220 to remove an air gap between the light source unit 210 and the optical layer 220.

In the direct-type backlight structure, because an air gap is between a light source and an optical layer, a vibration transfer characteristic may be weakened. On the other hand, when the diffusion layer 230 of the backlight unit 200 according to an embodiment of the present disclosure is filled between the light source unit 210 and the optical layer 220, an air gap of the backlight unit 200 may be removed. For example, the vibration generated by the vibration generating device 400 may be sequentially transferred to the light source unit 210, the diffusion layer 230, the optical layer 220, and the display panel 100, thereby reducing or preventing the loss of the vibration. Accordingly, the diffusion layer 230 may improve optical diffusivity of the backlight unit 200, and may improve a transfer characteristic of the vibration generated by the vibration generating device 400.

Moreover, when the diffusion layer is provided between the light source unit and the optical layer, an air gap or a gap of the display panel may be reduced, thereby providing a display apparatus for improving sound having a high frequency. For example, the high frequency may be about 2 kHz or more, but is not limited thereto.

The diffusion layer 230 may be filled between the PCB 213 and the printed plate 225. Thus, a supporter of the optical sheet part 221 may not be needed, and the printed plate 225 may be configured as one body with the optical sheet part 221. Also, the PCB 213, the diffusion layer 230, the printed plate 225, and the optical sheet part 221 may be implemented as one body. Thus, a vibration of the vibration generating device 400 may be transferred to the display panel 100 without being attenuated.

The diffusion layer 230 may include a photocurable material 231 and a light diffusing material 233. For example, the light diffusing material 233 may be injected into the photocurable material 231, and, by completely curing the photocurable material 231, the diffusion layer 230 may be formed. In a completely cured material, a result of a hardness pencil test (e.g., a scale of 9B being softest to 9H being hardest) may correspond to "H" or more, and in a half cured material, a result of a pencil test may correspond to "B" or less. For example, the completely cured material may be higher in degree of cure (hardness) than the half cured material. Thus, the completely cured material may be high in a vibration transfer characteristic. On the other hand, the half cured material may be lower in degree of cure than the completely cured material. Thus, the half cured material may be vulnerable to a vibration, and may cause smears of the backlight unit 200. The completely cured diffusion layer 230 may diffuse the light, emitted from the light source unit 210, to a front surface of the backlight unit 200 through the light diffusing material 233, and may simultaneously improve a transfer characteristic of a vibration generated by the vibration generating device 400 using the photocurable material 231. Also, the diffusion layer 230 may be completely cured using the photocurable material 231. Thus, the photocurable material 231 may be referred to as "diffusion resin molding." For example, the photocurable material 231 may include a photocurable resin including one or more of: acrylate, polyacrylate, and methacrylate, and may be completely cured, thereby improving a vibration transfer characteristic of the backlight unit 200.

The light diffusing material 233 may be injected into the photocurable material 231, and may have optical diffusivity. For example, the light diffusing material 233 may include a bead, including one or more of: silica, poly methyl methacrylate (PMMA), and polystyrene. The optical diffusivity of the backlight unit 200 may be improved. Also, the light diffusing material 233 may include polydispersed beads having the same size or different sizes. When the bead is applied, smears, such as mura occurring in the light sources 211, may be reduced or prevented.

Figure 4:
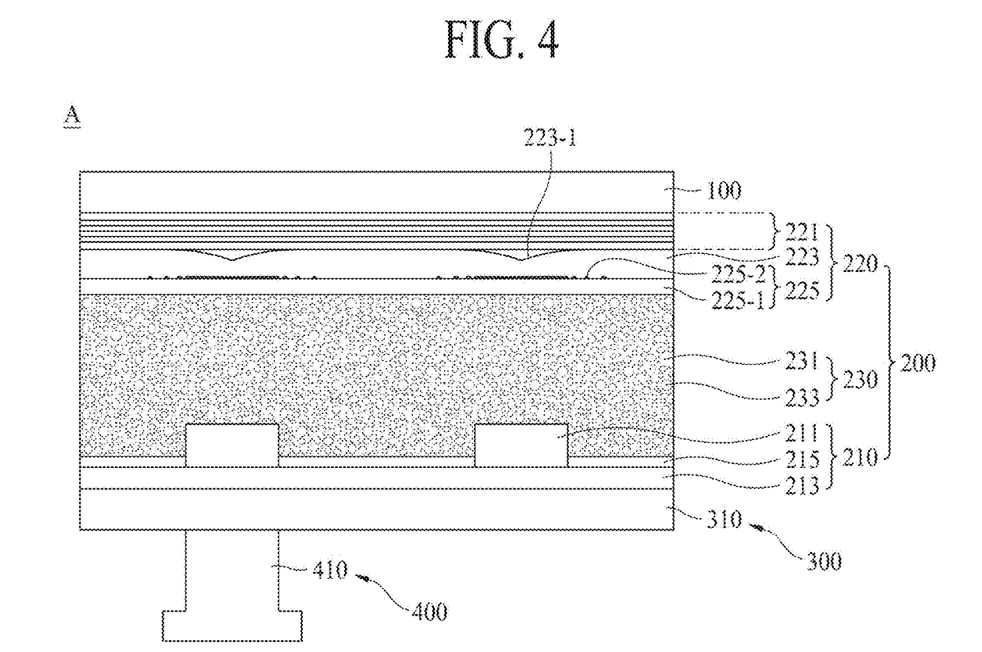
FIG. 4 is a cross-sectional view illustrating region A of FIG. 2 in a display apparatus according to another embodiment of the present disclosure.

FIG. 4 is a cross-sectional view illustrating region A of FIG. 2 in a display apparatus according to another embodiment of the present disclosure.

For example, the display apparatus of FIG. 4 may be implemented by modifying a configuration of the diffuser plate 223 of the display apparatus of FIG. 3. Thus, the same elements as the above-described elements will be briefly described below or their descriptions are omitted.

With reference to FIG. 4, an optical layer 220 may include an optical sheet part 221, a diffuser plate 223, and a printed plate 225. The optical sheet part 221 may be on a rear surface of a display panel 110. For example, the optical sheet part 221 may improve luminance characteristic of light emitted from a light source unit 210, and may transfer a vibration of each of a diffusion layer 230, the printed plate 225, and the diffuser plate 223 to the display panel 100. According to an embodiment, the optical sheet part 221 may include a complex optical sheet that has a function of diffusing light incident thereon and a function of collecting the diffused light.

The diffuser plate 223 may be on a rear surface of the optical sheet part 221. According to an embodiment, the diffuser plate 223 may include a material that is higher in optical diffusivity than the optical sheet part 221. For example, the diffuser plate 223 may be between the optical sheet part 221 and the printed plate 225. Thus, diffusivity of light emitted from the light source unit 210 may be improved. Although the optical sheet part 221 includes at least one diffuser sheet, when the optical layer 220 includes the diffuser plate 223, the optical diffusivity may be improved.

According to an embodiment, the diffuser plate 223 may include a material that is higher in a vibration transfer characteristic than the optical sheet part 221. For example, a thickness of the diffuser plate 223 may be thicker than that of one sheet in the optical sheet part 221. The diffuser plate 223 may improve the optical diffusivity, and may support the optical sheet part 221. Accordingly, the diffuser plate 223 may support the optical sheet part 221 including the plurality of optical sheets, thereby improving a vibration transfer characteristic of the optical layer 220.

As described above, the diffuser plate 223 may include a material that is higher in at least one of optical diffusivity and a vibration transfer characteristic than the optical sheet part 221. Thus, the optical diffusivity and a vibration transfer characteristic of the optical layer 220 may be improved.

The diffuser plate 223 may further include a concave portion 223-1 in a region overlapping each of a plurality of light sources 211 included in the light source unit 210. The concave portion 223-1 of the diffuser plate 223 may overlap each of the plurality of light sources 211, and may diffuse light emitted from each of the plurality of light sources 211 to a front surface of the backlight unit 200. For example, the concave portion 223-1 of the diffuser plate 223 may correspond to the plurality of light sources 211. For example, the concave portion 223-1 of the diffuser plate 223 may be formed by an engraving having a lens shape. For example, a shape of the concave portion 223-1 is not limited to a shape illustrated in the drawing, and may be implemented in various shapes that maintain optical diffusivity and a vibration transfer characteristic.

According to an embodiment, the concave portion 223-1 of the diffuser plate 223 may overlap each of the plurality of light sources 211, and may overlap a reflective material 225-2 printed on a base film 225-1 of the printed plate 225. Therefore, the diffusion layer 220 may diffuse light emitted from the light source unit 210 to a front surface of a backlight unit 200 through the reflective material 225-2 of the printed plate 225 and the concave portion 223-1 of the diffusion plate 223.

In a related art direct-type backlight unit, because an air gap is between a light source and an optical layer, a lens covering the light source may diffuse light emitted from the light source, but, due to the air gap, a vibration transfer characteristic may be weakened. However, the diffusion layer 230 of the backlight unit 200 according to an embodiment of the present disclosure may be filled between the light source unit 210 and the optical layer 220. Thus, an air gap of the backlight unit 200 may be removed. For example, a vibration generated by a vibration generating device 400 may be sequentially transferred to the light source unit 210, the diffusion layer 230, the optical layer 220, and the display panel 100, thereby reducing or preventing the loss of the vibration. Also, the diffuser plate 223 may include the concave portion 223-1 that overlaps each of the plurality of light sources 211 or corresponds to the plurality of light sources 211. Thus, the diffuser plate 223 may diffuse the light emitted from each of the plurality of light sources 211 to the front surface of the backlight unit 200, even without an additional lens covering each of the plurality of light sources 211. Accordingly, the diffusion layer 230 may improve a vibration transfer characteristic of the backlight unit 200, and the concave portion 223-1 of the diffuser plate 223 may perform a lens function, thereby improving the vibration transfer characteristic and optical diffusivity of the backlight unit 200.

The printed plate 225 may be on a rear surface of the diffuser plate 223, and may disperse or distribute the light emitted from the light source unit 210 to a front surface of the optical layer 220. For example, the printed plate 225 may be between the diffuser plate 223 and the diffusion layer 230, and may disperse or distribute the light emitted from the light source unit 210 to the front surface of the optical layer 220. Also, the printed plate 225 may transfer a vibration, transferred from the diffusion layer 230, to the display panel 100 through the diffuser plate 223 and the optical sheet part 221.

Figure 5:
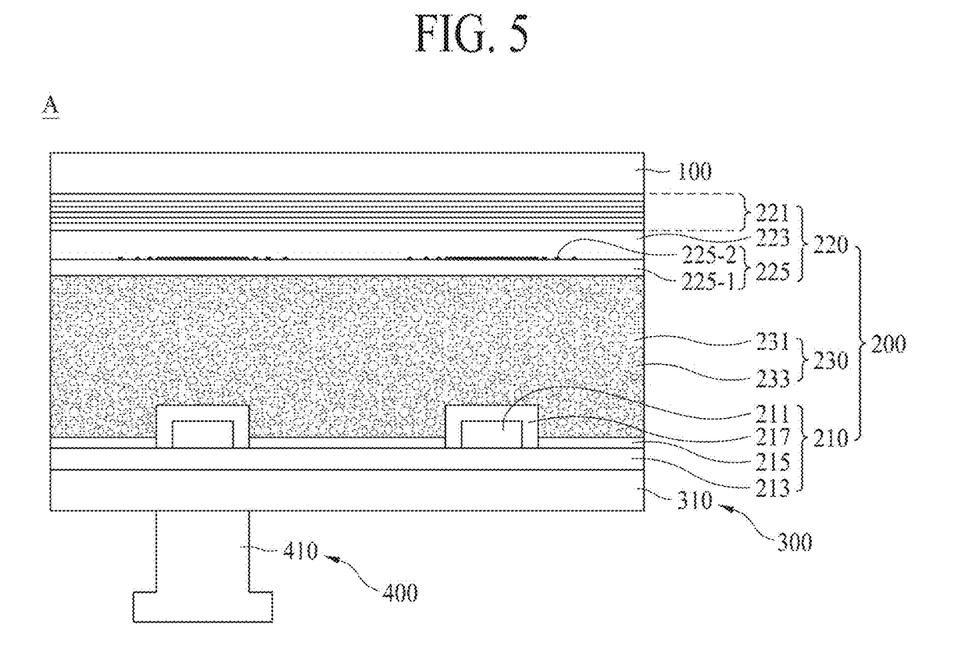
FIG. 5 is a cross-sectional view illustrating region A of FIG. 2 in a display apparatus according to another embodiment of the present disclosure.

FIG. 5 is a cross-sectional view illustrating region A of FIG. 2 in a display apparatus according to another embodiment of the present disclosure.

For example, the display apparatus of FIG. 5 may include a light source element 217 and an optical sheet part 221, unlike the display apparatus of each of FIGS. 3 and 4. Thus, the same elements as the above-described elements will be briefly described below or their descriptions are omitted.

With reference to FIG. 5, a light source unit 210 may further include a fluorescent element 217 covering each of a plurality of light sources 211 included in the light source unit 210. For example, the fluorescent element 217 may be between a diffusion layer 230 and each of the plurality of light sources 211, and a fluorescent sheet of an optical sheet part 221 may be on a front surface of the diffusion layer 230. For example, the fluorescent element 217 and the fluorescent sheet of the optical sheet part 221 may be opposite to each other with respect to the diffusion layer 230. In this case, light emitted from the plurality of light sources 211 may pass through the fluorescent element 217 and the diffusion layer 230, and may be provided to a display panel 100 via the fluorescent sheet of the optical sheet part 221. For example, a backlight unit 200 may allow the light emitted from the plurality of light sources 211 to sequentially pass through the fluorescent element 217, the diffusion layer 230, and the fluorescent sheet, thereby providing white light to the display panel 100.

According to an embodiment, each of the plurality of light sources 211 of the light source unit 210 may emit light having a first color, which may be one of red, green, and blue, and the fluorescent element 217 may include a fluorescent material having a second color, differing from the first color, e.g., of red, green, and blue. Also, the fluorescent sheet of the optical sheet part 221 may include a fluorescent material having a third color, differing from the first and second colors, e.g., of red, green, and blue. For example, a color of the light emitted from each of the plurality of light sources 211, a color of the fluorescent material of the fluorescent element 217, and a color of the fluorescent material of the fluorescent sheet may respectively correspond to red, green, and blue. Therefore, the color of the light emitted from each of the plurality of light sources 211, the color of the fluorescent material of the fluorescent element 217, and the color of the fluorescent material of the fluorescent sheet may be implemented so that the backlight unit 200 emits white light.

For example, when each of the plurality of light sources 211 of the light source unit 210 emits blue light, the fluorescent element 217 may include a red fluorescent material, and the fluorescent sheet of the optical sheet part 221 may include a green fluorescent material. Therefore, blue light emitted from each of the plurality of light sources 211 may pass through the fluorescent element 217 including the red fluorescent material, and may pass through the diffusion layer 230 and the fluorescent sheet including the green fluorescent material to be white.

As another example, when each of the plurality of light sources 211 of the light source unit 210 emits blue light, the fluorescent element 217 may include a green fluorescent material, and the fluorescent sheet of the optical sheet part 221 may include a red fluorescent material. Therefore, blue light emitted from each of the plurality of light sources 211 may pass through the fluorescent element 217 including the green fluorescent material, and may pass through the diffusion layer 230 and the fluorescent sheet including the red fluorescent material to be white.

When white light emitted from the light source unit 210 passes through the diffusion layer 230, the diffusion layer 230 may absorb a particular wavelength, causing a color shift. For example, the color shift may cause blurring of an image displayed by the display panel 100, thereby reducing the reliability of the display apparatus. To solve such a problem, in the backlight unit 200 according to the present disclosure, the light source unit 210 and the fluorescent sheet of the optical sheet part 221 may be opposite to each other with respect to the diffusion layer 230. Thus, the white light may not pass through the diffusion layer 230. Accordingly, the backlight unit 200 according to an embodiment the present disclosure may be adjusted so that the white light may not pass through the diffusion layer 230, thereby reducing or preventing the occurrence of the color shift.

Figure 6:
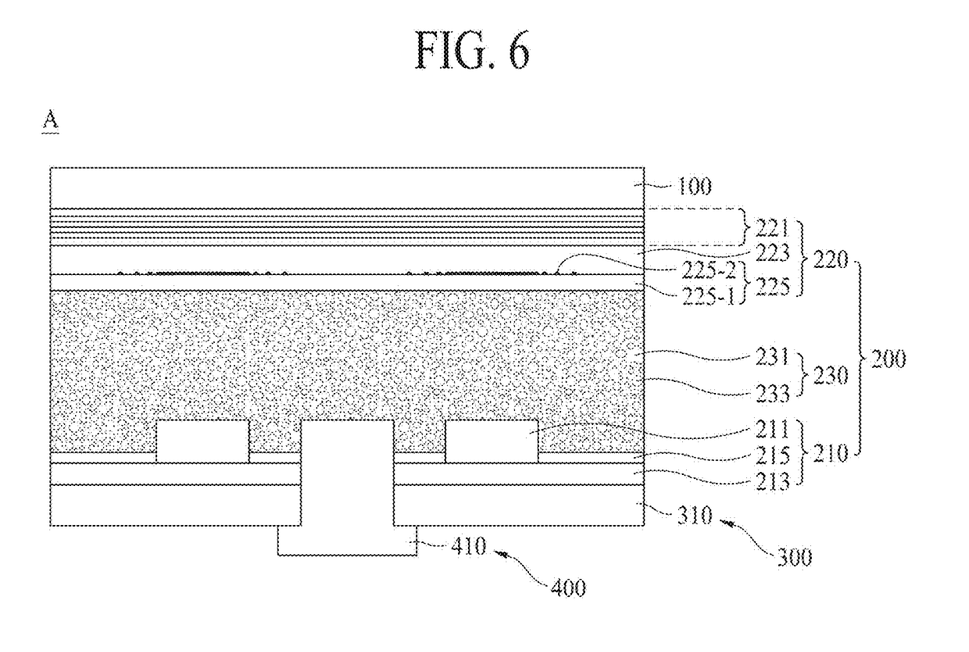
FIG. 6 is a cross-sectional view illustrating region A of FIG. 2 in a display apparatus according to another embodiment of the present disclosure.

FIG. 6 is a cross-sectional view illustrating region A of FIG. 2 in a display apparatus according to another embodiment of the present disclosure.

With reference to FIG. 6, a vibration generating device 400 may pass through a rear structure 300 to directly vibrate a backlight unit 200. According to an embodiment, the vibration generating device 400 may pass through the rear structure 300 and a light source unit 210, and may vibrate a diffusion layer 230 to transfer a vibration to the display panel 100. In this case, a rear cover 310 may include a hollow portion into which a portion of the vibration generating device 400 may be inserted or accommodated. The hollow portion may be hollowed in a circular or polygonal shape in some region of the rear cover 310 in a thickness direction TD of the rear cover 310. Therefore, an upper portion of the vibration generating device 400 may be inserted or accommodated into the hollow portion in the rear structure 300 to directly vibrate the diffusion layer 230. Thus, may reduce a vibration transfer path to improve a vibration transfer characteristic of the display apparatus, thereby improving sound pressure level (SPL).

Figure 7:
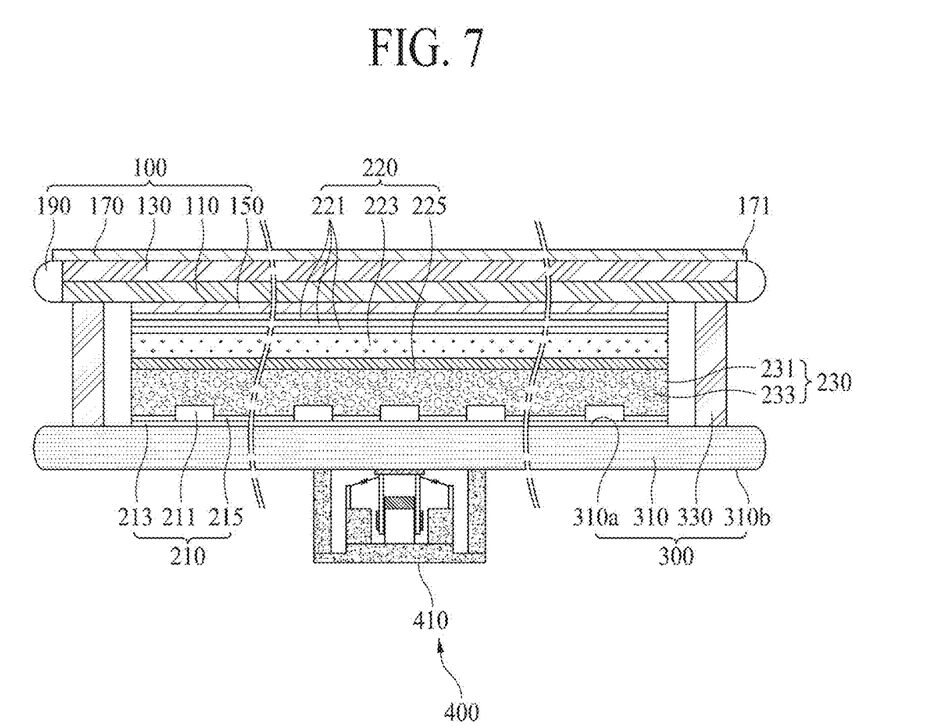
FIG. 7 is a cross-sectional view taken along line I-I' of FIG. 1.

FIG. 7 is a cross-sectional view taken along line I-I' of FIG. 1.

Hereinafter, the same elements as the above-described elements will be briefly described below or their descriptions are omitted. With reference to FIG. 7, a display panel 100 may include a lower substrate 110, an upper substrate 130, a lower polarization member 150, and an upper polarization member 170. The lower substrate 110 may be a thin film transistor (TFT) array substrate, and may include a pixel array part including a plurality of pixels respectively in a plurality of pixel areas defined by a plurality of gate lines and a plurality of data lines. Each of the plurality of pixels may include a TFT connected to a gate line and a data line each corresponding thereto, a pixel electrode connected to the TFT, and a common electrode adjacent to the pixel electrode and supplied with a common voltage. The backlight unit 200 may be on the front surface 310a of the rear structure 300, and the vibration generating device 400 may be on a rear surface 310b of the rear structure 300.

According to an embodiment, the lower substrate 110 may include a pad part in a first periphery thereof, and a gate driving circuit in a second periphery thereof. The pad part may provide a signal, supplied from the outside, to the pixel array part and the gate driving circuit. For example, the pad part may include a plurality of data pads connected to a data line through a data link line, and a plurality of gate pads connected to the gate driving circuit through a gate control signal line.

The gate driving circuit may be embedded (or integrated) into the first periphery of the lower substrate 110 to be connected to each of the plurality of gate lines in a one-to-one relationship. In this case, the gate driving circuit may be a shift register including a transistor that may be formed through the same process as a TFT provided in a pixel area.

The upper substrate 130 may be a color filter array substrate, and may include a black matrix, defining an opening region overlapping each of the plurality of pixel areas in the lower substrate 110, and a color filter provided in the opening region. The upper substrate 130 may be bonded or attached to the lower substrate 110 with a liquid crystal layer therebetween, e.g., using a sealant.

The liquid crystal layer may be between the lower substrate 110 and the upper substrate 130, and may include a liquid crystal in which an alignment direction of liquid crystal molecules may be changed based on an electric field generated by a data voltage applied to the pixel electrode in each of the plurality of pixels and the common voltage applied to the common electrode. The lower polarization member 150 may be attached on a rear surface of the lower substrate 110, and may polarize light, irradiated from the backlight unit 200 onto the lower substrate 110, to a first polarization axis. The upper polarization member 170 may be attached on a front surface of the upper substrate 130, and may polarize light, output to the outside via the upper substrate 130, to a second polarization axis differing from the first polarization axis.

According to an embodiment, the display panel 100 may further include a sealing member 190. The sealing member 190 may cover all of three corners and three outer surfaces, other than a first outer surface, of the display panel 100 adjacent to the pad part. The sealing member 190 may reduce or prevent light from being leaked through a side surface of the display panel 100. For example, the sealing member 190 may include a silicon-based sealant or an ultraviolet (UV) curable sealant (or resin). Considering a process tack time, the sealing member 190 may include the UV curable sealant. Also, the sealing member 190 may have a color (for example, blue, red, blue-green, or black), but is not limited thereto. For example, the sealing member 190 may include a colored resin or a light blocking resin for reducing or preventing light from being leaked through the side surface of the display panel 100.

According to an embodiment, a portion of an upper surface of the sealing member 190 may be covered by the upper polarization member 170. For example, the upper polarization member 170 may include an extension portion 171 that may lengthwise extend from an outer surface of the upper substrate 130 to cover a portion of a front surface of the sealing member 190, and may be attached on a portion of the front surface of the sealing member 190. Accordingly, a contact surface between the sealing member 190 and the upper substrate 130 may be concealed by the extension portion 171 of the upper polarization member 170, and may not be exposed at a forward region, at which a viewer is located, in front of the display apparatus.

The display panel 100 may drive the liquid crystal layer with an electric field generated by a data voltage and the common voltage each applied to each of the plurality of pixels, thereby displaying an image using light passing through the liquid crystal layer. Therefore, the display apparatus 10 may vibrate the display panel 100 without reducing sound pressure level generated by a multi-layer structure including the display panel 100 and the backlight unit 200 in a vibration transfer process, and may improve light luminance uniformity of the display panel 100. Thus, an image generating position of the display apparatus 10 may match a sound-generating position of the display apparatus 10, thereby improving an immersion experience of a viewer watching an image displayed by the display apparatus 10.

Figure 8:
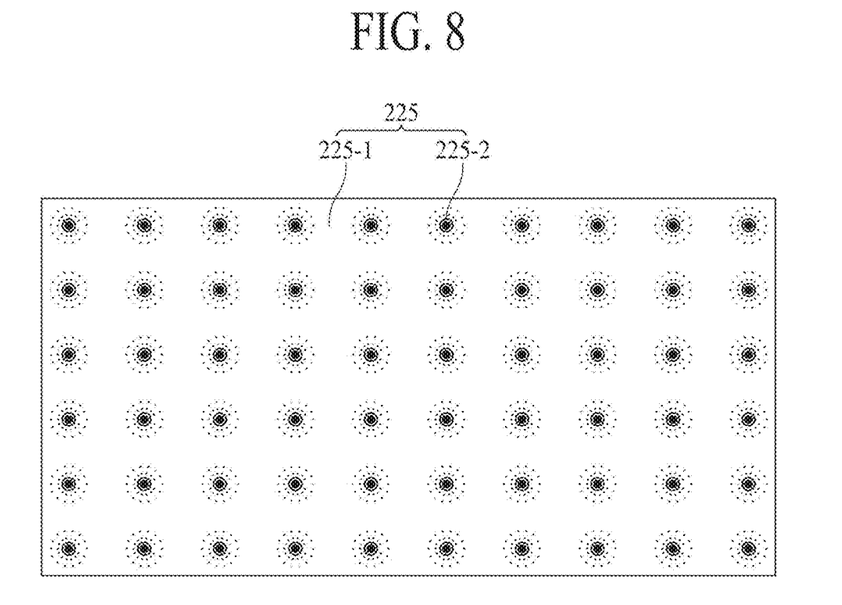
FIG. 8 illustrates a printed plate of a backlight unit according to an embodiment of the present disclosure.

FIG. 8 illustrates a printed plate of a backlight unit according to an embodiment of the present disclosure.

With reference to FIG. 8, a printed plate 225 may include a base film 225-1 and a reflective material 225-2 on the base film 225-1. The base film 225-1 may include a material that is high in light transmittance and a vibration transfer characteristic. For example, the base film 225-1 may include a polyethyleneterephthalate (PET)-based material, but is not limited thereto.

The reflective material 225-2 may be printed on the base film 225-1 in a region overlapping each of a plurality of light sources 211. The reflective material 225-2 may be mainly disposed in the region overlapping each of the plurality of light sources 211. Thus, the reflective material 225-2 may reduce or prevent the light emitted from a light source unit 210 from concentrating on a certain portion, and may disperse or distribute the light emitted from the light source unit 210 to a front surface of an optical layer 220.

According to an embodiment, the amount of reflective material 225-2 printed on the base film 225-1 may decrease along a direction from the region overlapping each of the plurality of light sources 221. For example, the amount of reflective material 225-2 printed on the base film 225-1 may decrease along a direction outward from the region overlapping each of the plurality of light sources 221. For example, the reflective material 225-2 may be mainly printed on the base film 225-1 in the region overlapping each of the plurality of light sources 221, and the amount of printed reflective material 225-2 may decrease in a direction outward from the region overlapping each of the plurality of light sources 221. The reflective material 225-2 may include titanium dioxide ($TiO_2$), but is not limited thereto, and may include another material having a high reflectivity.

Figure 9:
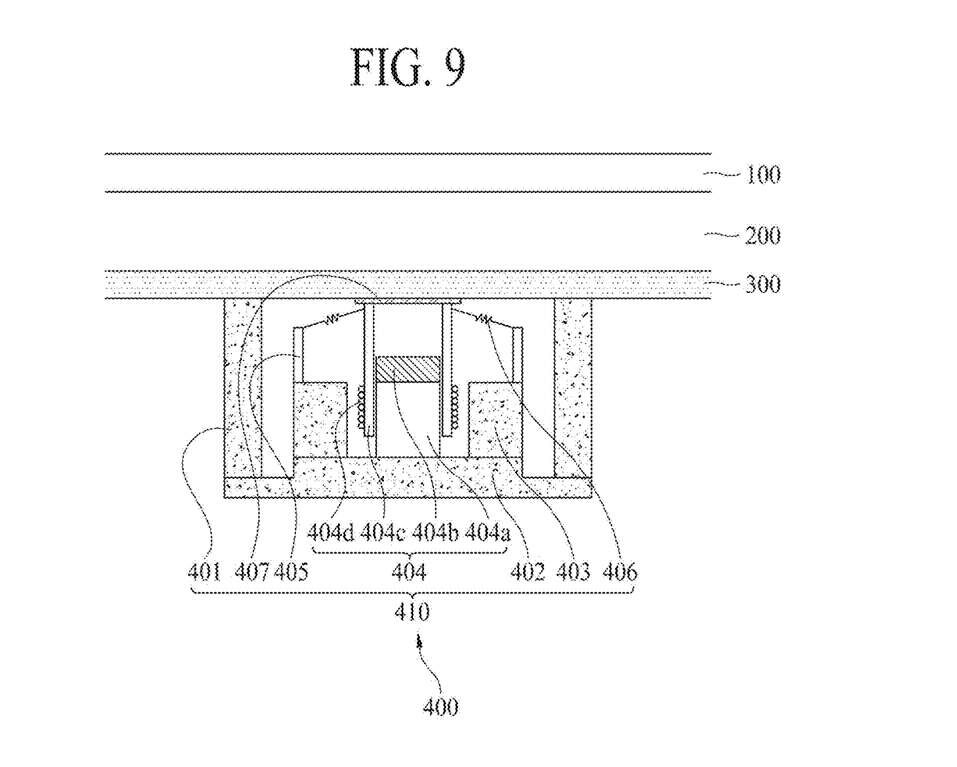
FIG. 9 is a cross-sectional view of a vibration generating device according to an embodiment of the present disclosure.

FIG. 9 is a cross-sectional view of a vibration generating device according to an embodiment of the present disclosure.

With reference to FIG. 9, the vibration generating device 400 may include at least one sound generating module 410 in a rear structure 300. The at least one sound generating module 410 may vibrate a display panel 100 using a backlight unit 200. The at least one sound generating module 410 may vibrate the rear structure 300 with a current applied based on Fleming's Left-Hand Rule for Motors, and may be referred to as a "vibration generating module." The at least one sound generating module 410 may include a supporting frame 401, a module frame 402, a side frame 403, a vibration unit 404, an external frame 405, a damper 406, and a heat insulation member 407.

The supporting frame 401 may be on a rear surface of the rear structure 300. For example, the supporting frame 401 may be attached to the rear surface of the rear structure 300, and may fix and support the vibration generating device 400. Both ends of the supporting frame 401 may be connected to an outer portion of the module frame 402 and the rear structure 300, and the supporting frame 401 may surround the side frame 403, the vibration unit 404, and the external frame 405, each disposed on the module frame and spaced apart from the supporting frame 401. Also, the supporting frame 401 may have a certain length, e.g., for securing a space in which the vibration unit 404 on the module frame 402 may vibrate. For example, the supporting frame 401 may be connected to the module frame 402 using a bolt and a nut.

The module frame 402 may be fixed by the supporting frame 401, and may support the vibration unit 404. For example, an outer portion of a front surface of the module frame 402 may be fixed by the supporting frame 401, and a center portion of the front surface of the module frame 402 may support the vibration unit 404. Also, the module frame 402 may support the side frame 403 between the outer portion and the center portion of the front surface of the module frame 402. Also, a rear surface of the module frame 402 may protrude toward a backward region of the rear structure 300.

According to an embodiment, the module frame 402 may support a rear portion of a magnet member 404a. The module frame 402 may control a magnetic flux generated based on the magnet member 404a along with an upper plate 404b, thereby increasing a magnetic flux density flowing in the vibration unit 404. Accordingly, the module frame 402 and the upper plate 404b may be respectively disposed on a lower portion and an upper portion of the magnet member 404a, and may increase a magnetic flux density generated based on the magnet member 404a and a coil 404d to improve a vibration characteristic.

The side frame 403 may be on the module frame 402, and may surround a lower portion of the vibration unit 404 spaced apart therefrom. For example, the side frame 403 may include a conductive material, and may control a magnetic flux generated by the magnet member 404a. For example, the side frame 403 may surround the magnet frame 404a spaced apart therefrom, and may allow a magnetic flux generated in the magnet member 404a to concentrate on the inside of the vibration unit 404, thereby reducing or preventing the leakage of the magnetic flux. Accordingly, the upper plate 404b may be in the upper portion of the magnet member 404a, the module frame 402 may be in the lower portion of the magnet member 404a, and the side frame 403 may surround a side surface of the magnet member 404a spaced apart therefrom, thereby reducing or preventing the leakage of a magnetic flux generated in the magnet member 404a to increase a magnetic flux density and improve a vibration characteristic.

Moreover, the side frame 403 may be provided as one body with the module frame 402. Alternatively, after the module frame 402 is formed, the side frame 403 may be attached on the module frame 402. The side frame 403 is not limited to the term, and may be referred to, for example, as a "yoke."

The vibration unit 404 may be on the module frame 402 to vibrate the rear structure 300. The vibration unit 404 may vibrate based on a vibration signal corresponding to a sound signal associated with an image using the module frame 402 as a supporter. Also, the vibration unit 404 may overlap the vibration generating device 400.

The vibration unit 404 may include the magnet member 404a, the upper plate 404b, an elevation member 404c, and the coil 404d. The magnet member 404a may be on the module frame 402. For example, the magnet member 404a may be between the upper plate 404b and the module frame 402, and may be surrounded by the side frame 403 spaced apart from the magnet member 404a. According to an embodiment, the upper plate 404b may be in one portion of the magnet member 404a, and the module frame 402 may be in the other portion opposite to the one portion of the magnet member 404a, whereby the upper plate 404b and the module frame 402 may control the magnetic flux generated in the magnet member 404a. Accordingly, the magnet member 404a may be between the upper plate 404b and the module frame 402, and the magnetic flux generated in the magnet member 404a may concentrate on the inside of the vibration unit 404, thereby reducing or preventing the leakage of the magnetic flux.

According to an embodiment, the magnet member 404a may be a permanent magnet having, e.g., a ring shape or a cylindrical shape. For example, the magnet member 404a may be implemented with a sintered magnet, such as barium ferrite. A material of the magnet member 404a may include iron(III) oxide ($Fe_2O_3$), barium carbonate ($BaCO_3$), a neodymium magnet, strontium ferrite with an improved magnet component, an alloy cast magnet including aluminum (Al), nickel (Ni), and cobalt (Co), and/or the like. Embodiments are not limited to these examples.

The upper plate 404b may be in the upper portion of the magnet member 404a, and may be spaced apart from the rear structure 300. Also, the magnet member 404a and the upper plate 404b may be inserted or accommodated into the elevation member 404c having, e.g., a cylindrical shape. Thus, an outer circumference surface of each of the magnet member 404a and the upper plate 404b may be surrounded by the elevation member 404c. Therefore, the elevation member 404c may guide a rectilinear reciprocating motion of each of the magnet member 404a and the upper plate 404b. For example, the upper plate 404b may be referred to as a "center pole" or as "pole pieces." According to an embodiment, the upper plate 404b may include a material having magnetism, such as iron (Fe). Thus, the upper plate 404b may increase a magnetic flux density generated based on the magnet member 404a.

The elevation member 404c may surround the magnet member 404a, and may contact a rear surface of the rear structure 300. According to an embodiment, the elevation member 404c may surround the magnet member 404a and the upper plate 404b, and may contact the rear surface of the rear structure 300. When a current for generating sound is applied to the coil 404d wound around an outer circumference surface of the elevation member 404c, and thus an electric field is generated in the vibration unit 404, the elevation member 404c may vibrate the rear structure 300 based on the electric field. Therefore, because a front surface of the elevation member 404c contacts the rear surface of the rear structure 300, the elevation member 404c may vibrate the rear structure 300 according to whether a current is applied or not, the display panel 110 may receive a vibration of the rear structure 300, and a sound wave may be output to a forward region in front of the display panel 110. For example, the elevation member 404c may include a material through which a magnetic flux may pass, and which is low in thermal conductivity. For example, the elevation member 404c may include a cylindrical structure including a material obtained by processing pulp or paper, Al or Mg or an alloy thereof, synthetic resin such as polypropylene, or a polyamide-based fiber. Embodiments are not limited to these examples.

According to another embodiment, the elevation member 404c may be inserted or accommodated into the magnet member 404a. For example, the elevation member 404c may be inserted or accommodated into the magnet member 404a having, e.g., a ring shape. Thus, an outer circumference surface of the elevation member 404c may be surrounded by the magnet member 404a.

The coil 404d may be wound around the outer circumference surface of the elevation member 404c, and may surround the magnet member 404a spaced apart therefrom. For example, the coil 404d may be wound around the outer circumference surface of the elevation member 404c, may surround the magnet member 404a spaced apart therefrom, and may be supplied with a current for generating sound. For example, the coil 404d may be referred to as a "voice coil." When the current for generating sound is applied to the coil 404d, the elevation member 404c may be guided by the damper 406 and may vibrate according to Fleming's Left-Hand Rule for Motors based on an application magnetic field generated around the coil 404d and an external magnetic field generated around the magnet member 404a.

Accordingly, the elevation member 404c may be guided by the damper 406, and may vibrate to transfer a vibration to the rear structure 300.

The external frame 405 may extend from an outer portion of an upper portion of the side frame 403 to the rear structure 300. Also, the external frame 405 may be spaced apart from the elevation member 404c in parallel. An upper portion of the external frame 405 may be connected to the damper 406, and may support one portion of the damper 406. Therefore, while the other portion of the damper 406 is guiding a vibration of the elevation member 404c in connection with the elevation member 404c, the external frame 405 may be fixed to an upper portion of the side frame 403, and may support the one portion of the damper 406.

The damper 406 may be between the external frame 405 and the elevation member 404c, and may guide a vibration of the elevation member 404c. For example, the one portion of the damper 406 may be connected to an upper end of the external frame 405, and the other portion of the damper 406 may be connected to the elevation member 404c. The damper 406 may be provided as a creased structure that is creased between the one portion and the other portion thereof, and may be contracted and relaxed based on a rectilinear reciprocating motion of the elevation member 404c to control and guide a vibration of the elevation member 404c. Therefore, the damper 406 may be connected between the external frame 405 and the elevation member 404c. Thus, the damper 406 may limit a vibration distance of the elevation member 404c using a restoring force of the damper 406. For example, when the elevation member 404c vibrates by a certain distance or more or vibrates by a certain distance or less, the elevation member 404c may be restored to an original position by the restoring force of the damper 406. Also, the damper 406 may be referred to as a "spider," a "suspension," or an "edge."

The heat insulation member 407 may be between the elevation member 404c and the rear structure 300, and may transfer a vibration of the elevation member 404c to the rear surface of the rear structure 300. According to an embodiment, the heat insulation member 407 may be a ring-shaped plate member attached on a front surface of the elevation member 404c or a circular plate member covering the whole front surface of the elevation member 404c.

According to an embodiment, the heat insulation member 407 may attach the elevation member 404c to the rear structure 300. For example, the heat insulation member 407 may be implemented with a double-sided tape, but is not limited thereto. When the heat insulation member 407 is implemented with a double-sided tape, rework may be easier than when the heat insulation member 407 is implemented with resin. For example, when the heat insulation member 407 is implemented with a double-sided tape, when the elevation member 404c is not normally attached on the rear structure 300, rework may be easy. Also, when the heat insulation member 407 is implemented with a double-sided tape, a process may be performed more easily than when the heat insulation member 407 is implemented with resin. Therefore, the heat insulation member 407 may block heat occurring in the elevation member 404c to not be transferred to the rear structure 300, and may attach the elevation member 404c on the rear structure 300 to efficiently transfer a vibration of the elevation member 404c to the rear structure 300.

The display apparatus according to the present disclosure may improve the quality of sound output to a forward region in front of the display panel, and may improve light luminance uniformity, thereby improving image quality. For example, in the display apparatus according to the present disclosure, a density of the vibration-transferred backlight unit may increase to increase a sound transfer effect, and light emitted from the light source may be diffused to the front surface of the display panel to improve light luminance uniformity. Also, the display apparatus according to the present disclosure may simultaneously improve a vibration transfer characteristic and light luminance uniformity using the backlight unit including the diffusion layer between the light source unit and the optical layer to diffuse light emitted from the plurality of light sources.

The display apparatus according to the present disclosure may output sound to a forward region in front of the display panel. Accordingly, an image-generating position of the display apparatus may match a sound-generating position of the display apparatus, thereby improving an immersion experience of a viewer watching an image displayed by the display apparatus.

Moreover, in the display apparatus according to the present disclosure, when the vibration generating device is attached on the rear surface of the display panel, a speaker may not separately be provided. Thus, a degree of freedom in speaker disposition may be improved, and an aesthetic design appearance of a set apparatus may be improved.

Moreover, the display apparatus according to the present disclosure may improve the quality of sound output to a forward region in front of the display panel, and may improve light luminance uniformity, thereby improving image quality. Moreover, in the display apparatus according to the present disclosure, a density of the vibration-transferred backlight unit may increase to increase a sound transfer effect, and light emitted from the light source may be diffused to the front surface of the display panel to improve light luminance uniformity.

Moreover, the display apparatus according to the present disclosure may simultaneously improve a vibration transfer characteristic and light luminance uniformity using the backlight unit including the diffusion layer between the light source unit and the optical layer to diffuse light emitted from the plurality of light sources. Moreover, in the display apparatus according to the present disclosure, when the diffusion layer is provided between the light source unit and the optical layer, an air gap or a gap of the display panel may be reduced, thereby improving high-frequency sound characteristic.

A display apparatus according to an embodiment of the present disclosure will be described below.

According to an embodiment of the present disclosure, a display apparatus may include: a display panel, a backlight unit on a rear surface of the display panel, the backlight unit including: a light source unit including a plurality of light sources overlapping a display area of the display panel, an optical layer on the rear surface of the display panel, and a diffusion layer between the light source unit and the optical layer, the diffusion layer being configured to diffuse light emitted from the plurality of light sources, and a vibration generating device configured to vibrate the backlight unit.

For example, in the display apparatus according to an embodiment of the present disclosure, the diffusion layer may be further configured to enhance a transfer characteristic of a vibration generated by the vibration generating device. For example, in the display apparatus according to an embodiment of the present disclosure, the diffusion layer may include: a photocurable material, and a light diffusing material injected into the photocurable material, the light diffusing material having optical diffusivity.

For example, in the display apparatus according to an embodiment of the present disclosure, the photocurable material may include a photocurable resin including at least one of: acrylate, polyacrylate, and methacrylate. For example, in the display apparatus according to an embodiment of the present disclosure, the light diffusing material may include a bead including at least one of: silica, poly methyl methacrylate (PMMA), and polystyrene. For example, in the display apparatus according to an embodiment of the present disclosure, the diffusion layer may be formed by injecting the light diffusing material into the photocurable material, and the photocurable material may be completely cured.

For example, in the display apparatus according to an embodiment of the present disclosure, the optical layer may include: an optical sheet part on the rear surface of the display panel, and a diffuser plate on a rear surface of the optical sheet part. For example, in the display apparatus according to an embodiment of the present disclosure, the optical sheet part may include a complex optical sheet configured to: diffuse light incident thereon, and collect the diffused light.

For example, in the display apparatus according to an embodiment of the present disclosure, the optical sheet part may include at least one of: a first optical sheet including a first diffuser sheet including a light scattering layer or a light scattering particle and on a front surface of the diffuser plate, a second optical sheet including a second diffuser sheet including a light scattering layer or a light scattering particle, the second optical sheet being attached to a front surface of the first optical sheet, and a third optical sheet including a prism sheet including a plurality of prism patterns, the third optical sheet being attached to a front surface of the second optical sheet.

For example, in the display apparatus according to an embodiment of the present disclosure, the optical sheet part may include at least one of: a first optical sheet including a first diffuser sheet including a light scattering layer or a light scattering particle and on a front surface of the diffuser plate, a lower prism sheet including a plurality of lower prism patterns that extend lengthwise in a horizontal axis direction and contact one another in a vertical axis direction, the lower prism sheet being attached to a front surface of the first optical sheet, and an upper prism sheet including a plurality of upper prism patterns that extend lengthwise in a vertical axis direction and contact one another in a horizontal axis direction, the upper prism sheet being attached to a front surface of the lower prism sheet.

For example, in the display apparatus according to an embodiment of the present disclosure, the diffuser plate may include a material that may be higher in at least one of optical diffusivity and a vibration transfer characteristic than the optical sheet part. For example, in the display apparatus according to an embodiment of the present disclosure, a thickness of the diffuser plate may be thicker than that of one sheet in the optical sheet part. For example, in the display apparatus according to an embodiment of the present disclosure, the diffuser plate may further include a concave portion in a region overlapping each of the plurality of light sources.

For example, in the display apparatus according to an embodiment of the present disclosure, the optical layer may further include a printed plate on a rear surface of the diffuser plate to disperse light, emitted from the light source unit, to a front surface of the optical layer. For example, in the display apparatus according to an embodiment of the present disclosure, the printed plate may include: a base film, and a reflective material on the base film.

For example, in the display apparatus according to an embodiment of the present disclosure, the reflective material may be printed in a region of the base film overlapping each of the plurality of light sources. For example, in the display apparatus according to an embodiment of the present disclosure, an amount of the reflective material printed on the base film may be reduced along a direction from the region overlapping each of the plurality of light sources.

For example, in the display apparatus according to an embodiment of the present disclosure, the optical sheet part may further include a fluorescent sheet including a fluorescent material. For example, in the display apparatus according to an embodiment of the present disclosure, each of the plurality of light sources of the light source unit may emit one color, and the fluorescent sheet of the optical sheet part may include a fluorescent material having a color differing from colors of the light emitted from the plurality of light sources. For example, in the display apparatus according to an embodiment of the present disclosure, the light source unit may be on a rear surface of the diffusion layer, and the fluorescent sheet may be on a front surface of the diffusion layer. For example, in the display apparatus according to an embodiment of the present disclosure, the light source unit may further include a fluorescent element covering each of the plurality of light sources.

For example, in the display apparatus according to an embodiment of the present disclosure, each of the plurality of light sources of the light source unit may emit light having a first color, the fluorescent element may include a fluorescent material having a second color, differing from the first color, and the fluorescent sheet of the optical sheet part may include a fluorescent material having a third color, differing from the first and second colors. For example, in the display apparatus according to an embodiment of the present disclosure, the fluorescent element may be between each of the plurality of light sources and the diffusion layer, and the fluorescent sheet may be on a front surface of the diffusion layer.

For example, the display apparatus according to an embodiment of the present disclosure may further include a rear structure configured to support the display panel and fix the backlight unit. For example, in the display apparatus according to an embodiment of the present disclosure, the vibration generating device may be configured to: directly vibrate the backlight unit, or directly vibrate the rear structure to transfer a vibration to the backlight unit. For example, in the display apparatus according to an embodiment of the present disclosure, the display panel may be configured to vibrate along with the vibration of the backlight unit to output sound toward a forward region in front of the display panel.

According to an embodiment of the present disclosure, a display apparatus may include: a display panel configured to display an image, a backlight unit on a rear surface of the display panel, the backlight unit including: a light source unit, an optical layer, and a diffusion layer between the light source unit and the optical layer, the diffusion layer including a photocurable material and a light diffusing material, a rear structure on a rear surface of the backlight unit, and a vibration generating device configured to vibrate the rear structure or the backlight unit to generate sound.

For example, in the display apparatus according to an embodiment of the present disclosure, the optical layer may further include: a diffuser plate on the rear surface of the display panel, and a printed plate on a rear surface of the diffuser plate. For example, in the display apparatus according to an embodiment of the present disclosure, the diffuser plate may further include a concave portion corresponding to the light source unit. For example, in the display apparatus according to an embodiment of the present disclosure, the printed plate may further include a reflective material corresponding to the light source unit.

According to an embodiment of the present disclosure, a backlight unit for a display apparatus may include: a light source unit, an optical layer, and a diffusion layer between the light source unit and the optical layer, the diffusion layer including: a photocurable material, and a light diffusing material.

For example, in the backlight unit for the display apparatus according to an embodiment of the present disclosure, the optical layer may further include a diffuser plate, and a printed plate on a rear surface of the diffuser plate. For example, in the backlight unit for the display apparatus according to an embodiment of the present disclosure, the optical layer may further include a fluorescent sheet including a fluorescent material. For example, in the backlight unit for the display apparatus according to an embodiment of the present disclosure, the diffuser plate may further include a concave portion corresponding to the light source unit. For example, in the backlight unit for the display apparatus according to an embodiment of the present disclosure, the printed plate may further include a reflective material corresponding to the light source unit.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. A display apparatus, comprising:
a display panel;
a backlight unit on a rear surface of the display panel, the backlight unit comprising:
a light source unit comprising a plurality of light sources overlapping a display area of the display panel;
an optical layer on the rear surface of the display panel; and
a diffusion layer between the light source unit and the optical layer, the diffusion layer being configured to diffuse light emitted from the plurality of light sources;
a rear structure on a rear surface of the backlight unit; and
a vibration generating device configured to vibrate the backlight unit at a rear surface of the light source unit overlapping the display area of the display panel,
wherein the vibration generating device is directly connected to a rear surface of the rear structure to vibrate the rear surface of the rear structure, and
wherein the vibration generating device overlaps with at least one of the plurality of light sources.

2. The display apparatus of claim 1, wherein a hardness of the diffusion layer is configured to have "H" or higher based on a pencil hardness test.

3. The display apparatus of claim 1, wherein the diffusion layer comprises:
a photocurable material; and
a light diffusing material injected into the photocurable material, the light diffusing material having optical diffusivity.

4. The display apparatus of claim 3, wherein the photocurable material comprises a photocurable resin comprising at least one of: acrylate, polyacrylate, and methacrylate.

5. The display apparatus of claim 3, wherein the light diffusing material comprises a bead comprising at least one of: silica, poly methyl methacrylate (PMMA), and polystyrene.

6. The display apparatus of claim 3, wherein:
the diffusion layer is formed by injecting the light diffusing material into the photocurable material; and
the photocurable material is completely cured.

7. The display apparatus of claim 1, wherein the optical layer comprises:
an optical sheet part on the rear surface of the display panel; and
a diffuser plate on a rear surface of the optical sheet part.

8. The display apparatus of claim 7, wherein the optical sheet part includes a complex optical sheet configured to:
diffuse light incident thereon; and
collect the diffused light.

9. The display apparatus of claim 7, wherein the optical sheet part comprises at least one of:
a first optical sheet comprising a first diffuser sheet comprising a light scattering layer or a light scattering particle and on a front surface of the diffuser plate;
a second optical sheet comprising a second diffuser sheet comprising a light scattering layer or a light scattering particle, the second optical sheet being attached to a front surface of the first optical sheet; and
a third optical sheet comprising a prism sheet comprising a plurality of prism patterns, the third optical sheet being attached to a front surface of the second optical sheet.

10. The display apparatus of claim 7, wherein the optical sheet part comprises at least one of:
a first optical sheet comprising a first diffuser sheet comprising a light scattering layer or a light scattering particle and on a front surface of the diffuser plate;
a lower prism sheet including a plurality of lower prism patterns that extend lengthwise in a horizontal axis direction and contact one another in a vertical axis direction, the lower prism sheet being attached to a front surface of the first optical sheet; and
an upper prism sheet including a plurality of upper prism patterns that extend lengthwise in a vertical axis direction and contact one another in a horizontal axis direction, the upper prism sheet being attached to a front surface of the lower prism sheet.

11. The display apparatus of claim 7, wherein the diffuser plate comprises a material that is higher in at least one of optical diffusivity and a vibration transfer characteristic than the optical sheet part.

12. The display apparatus of claim 8, wherein a thickness of the diffuser plate is thicker than that of one sheet in the optical sheet part.

13. The display apparatus of claim 7, wherein the diffuser plate further comprises a concave portion in a region overlapping each of the plurality of light sources.

14. The display apparatus of claim 7, wherein the optical layer further comprises a printed plate on a rear surface of the diffuser plate to disperse light, emitted from the light source unit, to a front surface of the optical layer.

15. The display apparatus of claim 14, wherein the printed plate comprises:
a base film; and
a reflective material on the base film.

16. The display apparatus of claim 15, wherein the reflective material is printed in a region of the base film overlapping each of the plurality of light sources.

17. The display apparatus of claim 15, wherein an amount of the reflective material printed on the base film is reduced along a direction from the region overlapping each of the plurality of light sources.

18. The display apparatus of claim 7, wherein the optical sheet part further comprises a fluorescent sheet comprising a fluorescent material.

19. The display apparatus of claim 18, wherein:
each of the plurality of light sources of the light source unit emits one color; and
the fluorescent sheet of the optical sheet part includes a fluorescent material having a color differing from colors of the light emitted from the plurality of light sources.

20. The display apparatus of claim 18, wherein:
the light source unit is on a rear surface of the diffusion layer; and
the fluorescent sheet is on a front surface of the diffusion layer.

21. The display apparatus of claim 18, wherein the light source unit further comprises a fluorescent element covering each of the plurality of light sources.

22. The display apparatus of claim 21, wherein:
each of the plurality of light sources of the light source unit emits light having a first color;
the fluorescent element comprises a fluorescent material having a second color, differing from the first color; and
the fluorescent sheet of the optical sheet part comprises a fluorescent material having a third color, differing from the first and second colors.

23. The display apparatus of claim 21, wherein:
the fluorescent element is between each of the plurality of light sources and the diffusion layer; and
the fluorescent sheet is on a front surface of the diffusion layer.

24. The display apparatus of claim 1, wherein the rear structure is configured to support the display panel and fix the backlight unit.

25. The display apparatus of claim 24, wherein the vibration generating device is configured to:
directly vibrate the backlight unit; or
directly vibrate the rear structure to transfer a vibration to the backlight unit.

26. The display apparatus of claim 25, wherein the display panel is configured to vibrate along with the vibration of the backlight unit to output sound toward a forward region in front of the display panel.

27. A display apparatus, comprising:
a display panel configured to display an image;
a backlight unit on a rear surface of the display panel, the backlight unit comprising:
a light source unit comprising a plurality of light sources overlapping a display area of the display panel;
an optical layer; and
a diffusion layer between the light source unit and the optical layer, the diffusion layer comprising a photo-curable material and a light diffusing material;
a rear structure on a rear surface of the backlight unit; and
a vibration generating device configured to vibrate the backlight unit at a rear surface of the light source unit overlapping the display area of the display panel to generate sound,
wherein the vibration generating device is directly connected to a rear surface of the rear structure to vibrate the diffusion layer between two adjacent light sources among the plurality of light sources.

28. The display apparatus of claim 27, wherein the optical layer further comprises:
a diffuser plate on the rear surface of the display panel; and
a printed plate on a rear surface of the diffuser plate.

29. The display apparatus of claim 28, wherein the diffuser plate further comprises a concave portion corresponding to the light source unit.

30. The display apparatus of claim 28, wherein the printed plate further comprises a reflective material corresponding to the light source unit.

* * * * *